US012712318B2

(12) United States Patent
Briant

(10) Patent No.: US 12,712,318 B2
(45) Date of Patent: Aug. 18, 2026

(54) CONNECTOR SYSTEM HAVING KEYED MATING

(71) Applicant: TE Connectivity Solutions GmbH, Schaffhausen (CH)

(72) Inventor: Eric David Briant, Dillsburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 495 days.

(21) Appl. No.: 18/156,180

(22) Filed: Jan. 18, 2023

(65) Prior Publication Data

US 2023/0344173 A1 Oct. 26, 2023

Related U.S. Application Data

(60) Provisional application No. 63/333,145, filed on Apr. 21, 2022.

(51) Int. Cl.

*H01R 13/6583* (2011.01)
*H01R 13/64* (2006.01)
*H01R 13/645* (2006.01)
*H01R 13/6581* (2011.01)

(52) U.S. Cl.

CPC ......... *H01R 13/64* (2013.01); *H01R 13/6581* (2013.01)

(58) Field of Classification Search

None

See application file for complete search history.

(56) References Cited

U.S. PATENT DOCUMENTS

| | | | | |
|---|---|---|---|---|
| 3,184,707 A * | 5/1965 | Anderson | H01R 13/6456 174/59 |
| 8,944,830 B2 * | 2/2015 | Little | H01R 12/724 439/79 |
| 9,065,230 B2 * | 6/2015 | Milbrand, Jr. | H01R 13/6599 |
| 9,413,115 B1 * | 8/2016 | Henry | H01R 13/6582 |
| 10,923,856 B2 * | 2/2021 | Sharf | H01R 13/6582 |
| 11,201,436 B2 * | 12/2021 | Poh | H01R 13/6582 |
| 2022/0052487 A1 * | 2/2022 | Chang | H01R 13/113 |

* cited by examiner

*Primary Examiner* — Felix O Figueroa

(57) ABSTRACT

A receptacle cage includes shielding walls forming a module channel configured to receive a pluggable module. The shielding walls include first and second end walls and first and second side walls. The first end wall, the first side wall and the second side wall form the module channel. The receptacle cage includes a hood extending from the first end wall forming a chamber located outside of the module channel. The receptacle cage includes a cage polarization slot formed in the first end wall at a first distance from the first side wall. The cage polarization slot is open to the chamber. The cage polarization slot is configured to receive a module polarization feature of the pluggable module such that the module polarization feature is located in the chamber and covered by the hood.

20 Claims, 7 Drawing Sheets

CONNECTOR SYSTEM HAVING KEYED MATING

CROSS REFERENCE TO RELATED APPLICATIONS

This application claims benefit to U.S. Provisional Application No. 63/333,145, filed 21 Apr. 2022, titled "CONNECTOR SYSTEM HAVING KEYED MATING", the subject matter of which is herein incorporated by reference in its entirety.

BACKGROUND OF THE INVENTION

The subject matter herein relates generally to connector systems.

Some communication systems utilize communication connectors to interconnect various components of the system for data communication. Some known communication systems use pluggable modules, such as I/O modules, that are electrically connected to the communication connector. Known communication systems provide electrical shielding, such as in the form of a receptacle cage surrounding the communication connector and the pluggable module to provide electrical shielding. Some high speed pluggable modules and corresponding receptacle cages have been developed having a polarization feature in the form of a post or tab extending form the top of the pluggable module and corresponding channel in the receptacle cage. The polarization feature restricts the possibility of loading the high speed pluggable module into an older style (lower speed) receptacle cage. However, the system requires a cutout in the panel that holds the cage aligned with the channel, which increases the cost and complexity of the system.

A need remains for a connector system having keyed mating features that allow keyed mating of pluggable modules with receptacle cages.

BRIEF DESCRIPTION OF THE INVENTION

In one embodiment, a receptacle cage is provided and includes shielding walls forming a module channel configured to receive a pluggable module. The shielding walls include a first end wall, a first side wall extending from the first end wall and a second side wall extending from the first end wall opposite the first side wall. The first end wall, the first side wall and the second side wall form the module channel. The receptacle cage includes a hood extending from the first end wall forming a chamber located outside of the module channel. The receptacle cage includes a cage polarization slot formed in the first end wall at a first distance from the first side wall. The cage polarization slot is open to the chamber. The cage polarization slot is configured to receive a module polarization feature of the pluggable module such that the module polarization feature is located in the chamber and covered by the hood.

In another embodiment, a receptacle cage is provided and includes shielding walls forming a module channel configured to receive a pluggable module. The shielding walls include a first end wall, a first side wall extending from the first end wall and a second side wall extending from the first end wall opposite the first side wall. The first end wall, the first side wall and the second side wall form the module channel. The receptacle cage includes a hood extending from the first end wall forming a chamber located outside of the module channel. The receptacle cage includes an EMI gasket coupled to the hood and the first end wall. The EMI gasket has a plurality of deflectable spring fingers. The deflectable spring fingers including inner spring fingers extending along the first end wall inside the module channel to interface with the pluggable module. The inner spring fingers separated by inner gaps. The receptacle cage includes a cage polarization feature for keyed mating of the pluggable module in the module channel. The cage polarization feature includes at least one cage polarization slot formed in the first end wall being open to the chamber. Each cage polarization slot is aligned with the corresponding inner gap of the EMI gasket between the inner spring fingers. Each cage polarization slot is configured to receive a corresponding module polarization feature of the pluggable module.

In another embodiment, a set of receptacle cages are provided and include a plurality of receptacle cages including a first receptacle cage and a second receptacle cage. Each receptacle cage of the plurality of receptacle cages include shielding walls forming a module channel configured to receive a pluggable module. The shielding walls including a first end wall, a first side wall extending from the first end wall and a second side wall extending from the first end wall opposite the first side wall. The first end wall, the first side wall and the second side wall form the module channel. The set of receptacle cages include a hood extending from the first end wall forming a chamber located outside of the module channel. The set of receptacle cages includes a cage polarization slot formed in the first end wall. The cage polarization slot open to the chamber. The cage polarization slot is configured to receive a module polarization feature of the pluggable module such that the module polarization feature is located in the chamber and covered by the hood. The cage polarization slot of the first receptacle cage is located a first distance from the first side wall of the first receptacle cage and the cage polarization slot of the second receptacle cage is located a second distance from the first side wall of the second receptacle cage. The second distance different than the first distance such that the pluggable module pluggable into the module channel of the first receptacle cage is unable to plug into the module channel of the second receptacle cage.

DETAILED DESCRIPTION OF THE INVENTION

Figure 1:
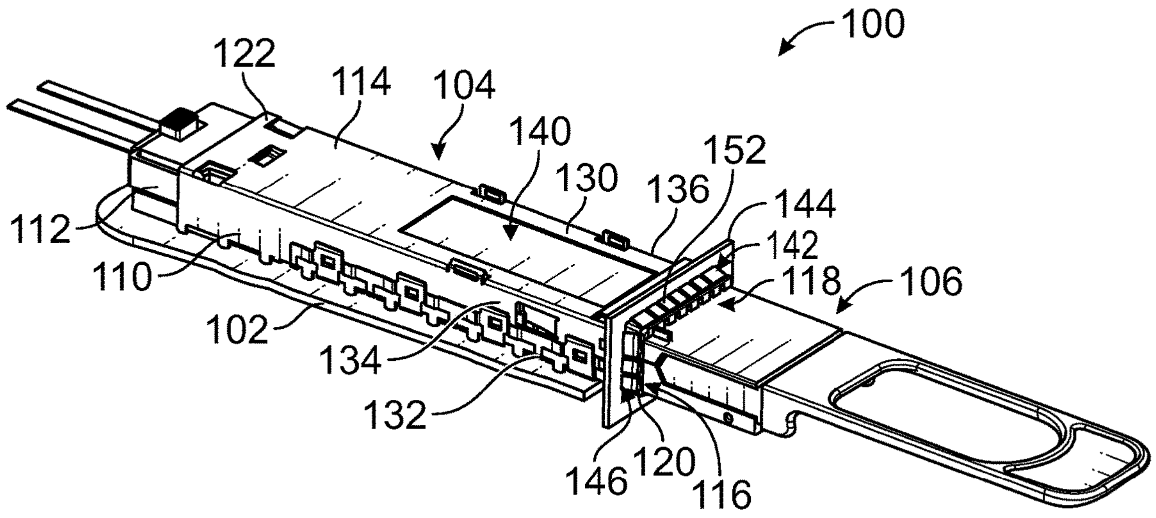
FIG. 1 is a front perspective view of a communication system formed in accordance with an exemplary embodiment.

FIG. 1 is a front perspective view of a communication system 100 formed in accordance with an exemplary embodiment. The communication system includes a host circuit board 102 and a receptacle connector assembly 104 mounted to the host circuit board 102. A pluggable module 106 (fully shown in FIG. 2) is configured to be electrically connected to the receptacle connector assembly 104. The pluggable module 106 is electrically connected to the host circuit board 102 through the receptacle connector assembly 104.

In an exemplary embodiment, the receptacle connector assembly 104 and the pluggable module 106 has keyed mating to ensure that the pluggable module 106 is mated with a correct receptacle connector assembly 104. Variations in the keyed mating allow mating of different types of pluggable modules 106 within the communication system 100. Different types of receptacle connector assemblies 104, having different polarization features, may be provided within the communication system 100 to receive the different types of pluggable modules 106. For example, the communication system 100 includes a set of the receptacle connector assemblies 104 (having different polarization features) that may be selectively utilized within the communication system 100 for mating with a corresponding set of the pluggable modules 106 (having different polarization features). The different receptacle connector assemblies 104 may have different characteristics (for example, different mating interfaces, different types of connectors, different sizes, different heat transfer elements, and the like) and the different pluggable modules 106 may have different characteristics (for example, different mating interfaces, different types of connectors, different sizes, different heat transfer elements, and the like).

In an exemplary embodiment, the receptacle connector assembly 104 includes a receptacle cage 110 and a communication connector 112 adjacent the receptacle cage 110. The communication connector 112 may be received in the receptacle cage 110. In other various embodiments, the communication connector 112 may be located rearward of the receptacle cage 110. In various embodiments, the receptacle cage 110 is enclosed and provides electrical shielding for the communication connector 112. The pluggable modules 106 are loaded into the receptacle cage 110 and are at least partially surrounded by the receptacle cage 110. In an exemplary embodiment, the receptacle cage 110 is a shielding, stamped and formed cage member that includes a plurality of shielding walls 114 that define one or more module channels for receipt of corresponding pluggable modules 106. In other embodiments, the receptacle cage 110 may be open between frame members to provide cooling airflow for the pluggable modules 106 with the frame members of the receptacle cage 110 defining guide tracks for guiding loading of the pluggable modules 106 into the receptacle cage 110.

In the illustrated embodiment, the receptacle cage 110 is a single port receptacle cage configured to receive a single pluggable module 106. In other various embodiments, the receptacle cage 110 may be a ganged cage member having a plurality of ports ganged together in a single row and/or a stacked cage member having multiple ports stacked as an upper port and a lower port. The receptacle cage 110 includes a module channel 116 having a module port 118 open to the module channel 116. The module channel 116 receives the pluggable module 106 through the module port 118. In an exemplary embodiment, the receptacle cage 110 extends between a front end 120 and a rear end 122. The module port 118 is provided at the front end 120. The module port 118 includes a polarization feature (for example, slot or keyway) for keyed mating with the pluggable module 106. Any number of module channels 116 may be provided in various embodiments arranged in a single column or in multiple columns (for example, 2×2, 3×2, 4×2, 4×3, 4×1, 2×1, and the like). Optionally, multiple communication connectors 112 may be arranged within the receptacle cage 110, such as when multiple rows and/or columns of module channels 116 are provided.

In an exemplary embodiment, the shielding walls 114 of the receptacle cage 110 include a first end wall 130, a second end wall 132, a first side wall 134, and a second side wall 136. The side walls 134, 136 extend between the end walls 130, 132. In various embodiments, the first end wall 130 is at a top of the receptacle cage 110, and thus defines a top wall, and the second end wall 132 is at a bottom of the receptacle cage 110, and thus defines a bottom wall. Other orientations are possible in alternative embodiments, such as the second end wall 132 or one of the side walls 134, 136 defining the top wall. The second end wall 132 may be an interior wall facing, and possibly resting on, the host circuit board 102. In other various embodiments, the first end wall 130 may be an interior wall facing, and possibly resting on, the host circuit board 102. In various embodiments, the receptacle cage 110 may be provided without the second end wall 132. Optionally, the walls 114 of the receptacle cage 110 may include a rear wall at the rear end 122.

The walls 114 define a cavity 140. For example, the cavity 140 may be defined by the first end wall 130, the second end wall 132, the side walls 134, 136 and the rear wall. The cavity 140 includes the module channel 116. In various embodiments, the cavity 140 receives the communication connector 112, such as at the rear end 122. Other walls 114 may separate or divide the cavity 140 into additional module channels 116, such as in embodiments using ganged and/or stacked receptacle cages. For example, the walls 114 may include one or more vertical divider walls between ganged module channels 116. In various embodiments, the walls 114 may include a separator panel between stacked upper and lower module channels 116. The separator panel may include an upper panel and a lower panel that form a space between the upper and lower module channels 116, such as for airflow, for a heat sink, for routing light pipes, or for other purposes. The separator panel(s) may include polarization features for keyed mating with the pluggable modules 106.

In an exemplary embodiment, the receptacle cage 110 may include one or more gaskets 142 at the front end 120 for providing electrical shielding for the module channels 116. For example, the gaskets 142 may be provided at the port 118 to electrically connect with the pluggable modules 106 received in the module channel 116. In an exemplary embodiment, one or more of the gaskets 142 include a polarization feature for keyed mating with the pluggable module 106. In an exemplary embodiment, the gaskets 142 may be provided around the exterior of the receptacle cage 110 for interfacing with a panel 144, such as when the front end 120 of the receptacle cage 110 extends through a cutout 146 in the panel 144. The gaskets 142 may include outer spring fingers 152 or other deflectable features that are configured to be spring biased against the panel 144 to create an electrical connection with the panel 144.

Optionally, the receptacle connector assembly 104 may include one or more heat sinks (not shown) for dissipating heat from the pluggable modules 106. For example, the heat sink may be coupled to the first end wall 130 for engaging the pluggable module 106 received in the module channel 116. The heat sink may extend through an opening in the first end wall 130 to directly engage the pluggable module 106. Other types of heat sinks may be provided in alternative embodiments.

In an exemplary embodiment, the pluggable modules 106 are loaded through the port 118 at the front end 120 to mate with the communication connector 112. The shielding walls 114 of the receptacle cage 110 provide electrical shielding around the communication connector 112 and the pluggable module 106, such as around the mating interface between the communication connector 112 and the pluggable module 106.

Figure 2:
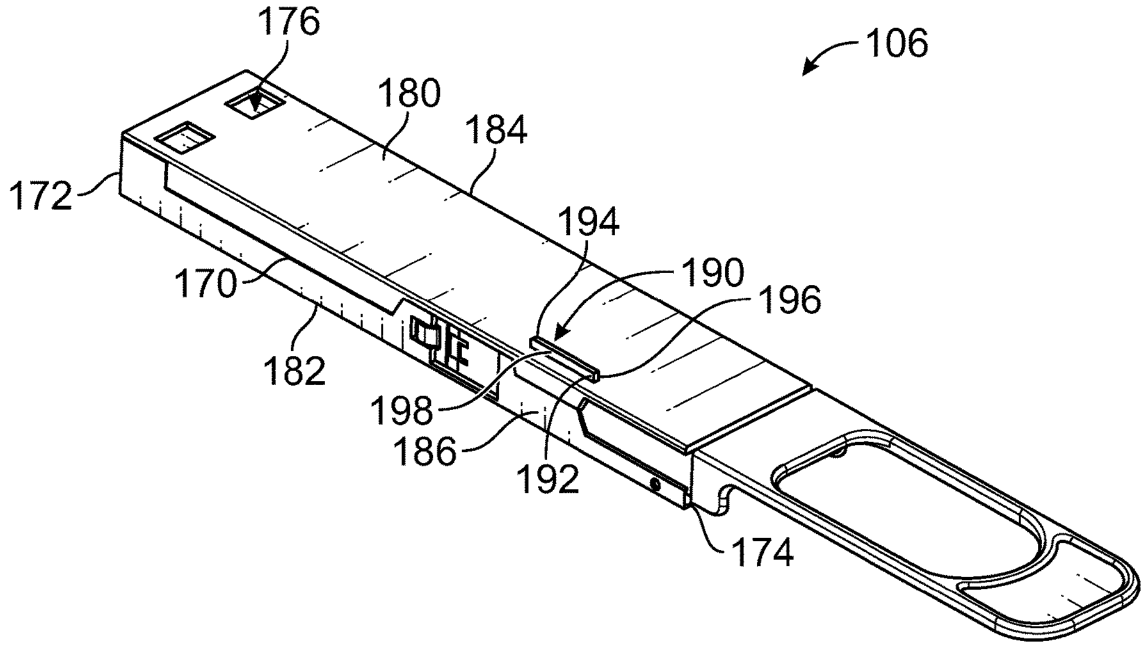
FIG. 2 is a perspective view of the pluggable module in accordance with an exemplary embodiment.

FIG. 2 is a perspective view of the pluggable module 106 in accordance with an exemplary embodiment. The pluggable module 106 has a pluggable body 170, which may be defined by one or more shells. The pluggable body 170 may be thermally conductive and/or may be electrically conductive, such as to provide EMI shielding for the pluggable module 106. The pluggable body 170 includes a mating end 172 and an opposite front end 174. The mating end 172 is configured to be inserted into the corresponding module channel 116 (shown in FIG. 1). The front end 174 may be a cable end having a cable extending therefrom to another component within the system.

The pluggable module 106 includes a connector interface 176, such as a module circuit board, which is configured to be communicatively coupled to the communication connector 112 (shown in FIG. 1). The connector interface 176 may be accessible at the mating end 172. The module circuit board has a mating edge and mating contacts at the mating edge configured to be mated with the communication connector 112. The module circuit board may include components, circuits and the like used for operating and/or using the pluggable module 106. For example, the module circuit board may have conductors, traces, pads, electronics, sensors, controllers, switches, inputs, outputs, and the like associated with the module circuit board, which may be mounted to the module circuit board, to form various circuits. In various embodiments, the pluggable module 106 may be a fiber optic module. The connector interface(s) 176 may include fiber optic cables and/or optical generators to transmit optical signals.

The pluggable module 106 includes an outer perimeter defining an exterior of the pluggable body 170. For example, the outer perimeter may be defined by a top 180, a bottom 182, a first side 184 and a second side 186. The pluggable body 170 may have other shapes in alternative embodiments. In an exemplary embodiment, the pluggable module 106 includes one or more module polarization features 190 at the outer perimeter. For example, the module polarization feature 190 may be provided at the top 180. The module polarization feature 190 is used to restrict mating of the pluggable module 106 in an incorrect orientation or with an incorrect receptacle cage 110. In the illustrated embodiment, the module polarization feature 190 is defined by a protrusion 192 extending from the pluggable body 170. For example, the module polarization feature 190 may be a post or tab extending from the top 180. In an exemplary embodiment, the module polarization feature 190 includes a top 194 and sides 196, 198. The sides 196, 198 may be planar. The sides 196, 198 may extend parallel to each other. The protrusion 192 has a protrusion width between the sides 196, 198. Optionally, the module polarization feature 190 may be offset, such as closer to the first side 184. Optionally, multiple module polarization features 190 may be provided. In other various embodiments, the module polarization feature 190 may be provided at other locations. The module polarization feature 190 may be provided at a predetermined depth from the mating end 172 to ensure that the mating end 172 and/or the module circuit board 176 does not mate with the communication connector 112 when plugged into the receptacle cage 110 with the module polarization feature 190 and incorrect orientation.

In an exemplary embodiment, the pluggable body 170 provides heat transfer for the module circuit board 176, such as for the electronic components on the module circuit board 176. For example, the module circuit board 176 is in thermal communication with the pluggable body 170 and the pluggable body 170 transfers heat from the module circuit board 176. Optionally, the pluggable body 170 may include a plurality of heat transfer fins (not shown) along at least a portion of the outer perimeter of the pluggable module 106 for dissipating heat from the pluggable body 170. In such embodiment, one or more of the heat transfer fins may be taller to define the module polarization feature(s) 190.

Figure 3:
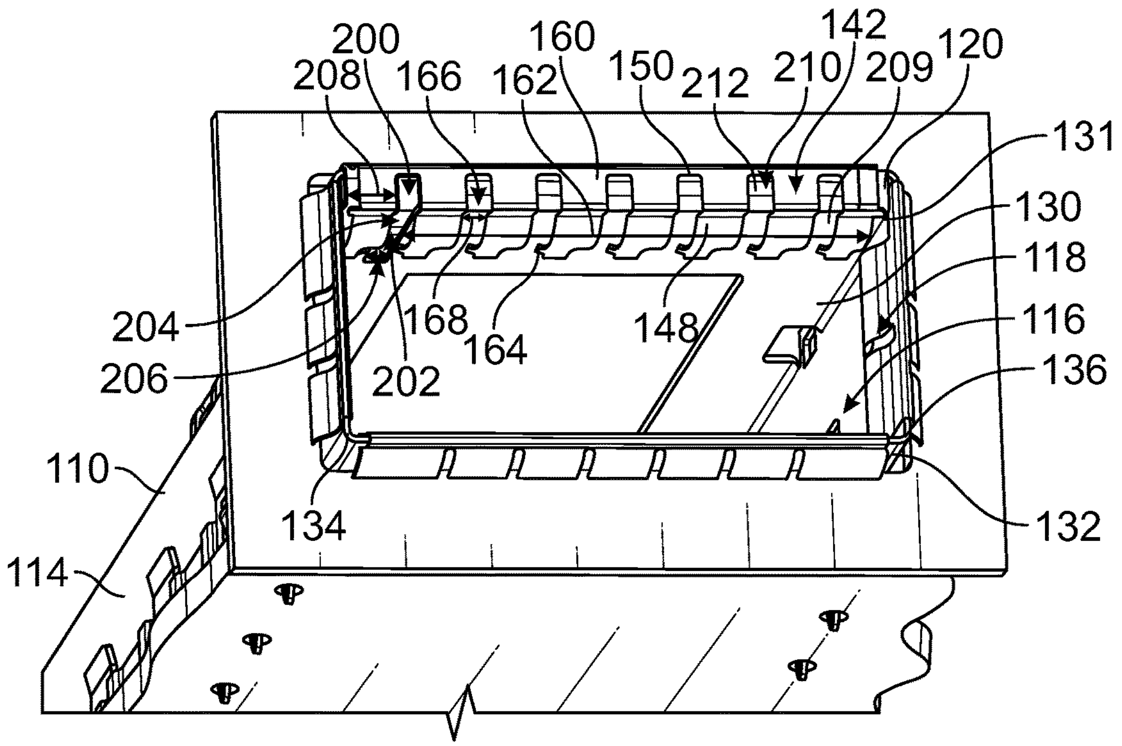
FIG. 3 is a bottom perspective view of the front end of the receptacle cage in accordance with an exemplary embodiment showing a first polarization orientation.
Figure 4:
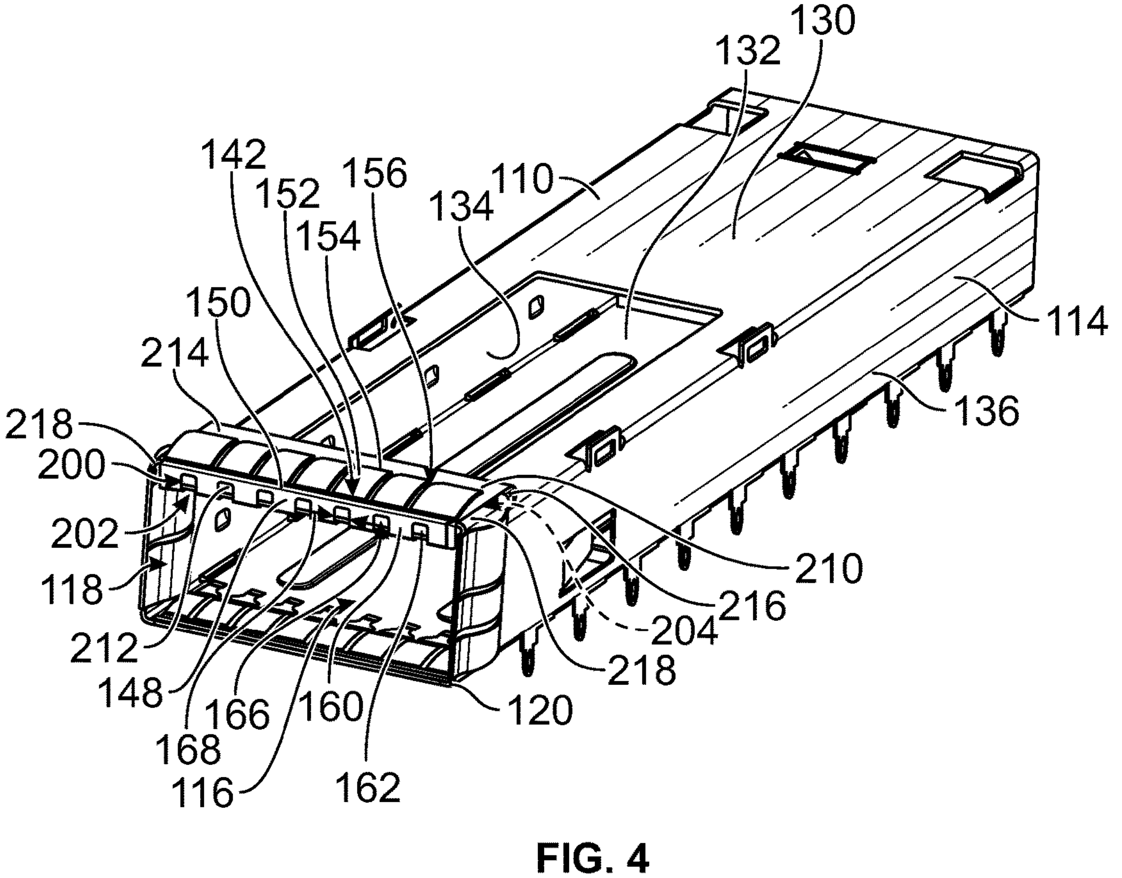
FIG. 4 is a top perspective view of the front end of the receptacle cage in accordance with an exemplary embodiment showing the first polarization orientation.

FIG. 3 is a bottom perspective view of the front end 120 of the receptacle cage 110 in accordance with an exemplary embodiment showing a first polarization orientation. FIG. 4 is a top perspective view of the front end 120 of the receptacle cage 110 in accordance with an exemplary embodiment showing the first polarization orientation. FIGS. 3 and 4 show the module port 118 to the module channel 116 open at the front end 120 configured to receive the pluggable module 106 therein. In the illustrated embodiment, the module channel 116 is surrounded by the first end wall 130, the second end wall 132, and the side walls 134, 136.

In an exemplary embodiment, the receptacle cage 110 includes a cage polarization feature 200 configured to interface with the module polarization feature 190 of the pluggable module 106. In the illustrated embodiment, the cage polarization feature 200 is provided along the first end wall 130 (for example, top wall); however, in alternative embodiments, the cage polarization feature 200 may be provided along one or more additional or alternative walls 114 of the receptacle cage 110. In an exemplary embodiment, the cage polarization feature 200 includes a cage polarization slot 202 open to the module channel 116. The cage polarization slot 202 receives the module polarization feature 190 of the pluggable module 106. For example, the cage polarization slot 202 may be sized and shaped to receive the module polarization feature 190 and may be positioned along the first end wall 130 to receive the module polarization feature 190. However, pluggable modules 106 having module polarization features 190 in other locations are unable to be plugged into the receptacle cage 110. Thus, the cage polarization feature 200 defines a keying feature for keyed mating of the pluggable module 106 with the receptacle cage 110.

In an exemplary embodiment, the receptacle cage 110 includes a hood 210 extending from the first end wall 130. The hood 210 surrounds the cage polarization feature(s) 200. The hood 210 defines a chamber 204 that receives the module polarization feature 190. The cage polarization slot 202 is open to the chamber 204. The chamber 204 receives the module polarization feature 190 through the cage polarization slot 202.

In an exemplary embodiment, the hood 210 is provided at a front edge 131 of the first end wall 130. The hood 210 includes a front wall 212 extending outward (for example, upward) from the first end wall 130 at the front edge 131. The hood 210 includes an outer wall 214 extending rearward from the front wall 212. The outer wall 214 is spaced apart from the first end wall 130 and may extend parallel to the first end wall 130. The chamber 204 is defined between the first end wall 130 and the outer wall 214. The hood 210 includes a hood rear wall 216 extending from the outer wall 214. The hood rear wall 216 is coupled to the first end wall 130, such as being welded or soldered to the first end wall 130. The chamber 204 is defined between the front wall 212 and the hood rear wall 216. In an exemplary embodiment, the hood 210 includes hood side walls 218 extending from the outer wall 214. The hood side walls 218 may be coupled to the first end wall 130, such as being welded or soldered to the first end wall 130. The chamber 204 is defined between the hood side walls 218. In an exemplary embodiment, the hood 210 is integral with the first end wall 130. For example, the hood 210 is formed with the first end wall 130, such as being stamped and formed with the first end wall 130. The hood 210 is a continuous part of the first end wall 130 that is folded back over the first end wall 130 to form the chamber 204. The front wall 212, the hood rear wall 216, and the hood side walls 218 support the outer wall 214 relative to the first end wall 130. In various embodiments, the walls 212, 214, 216, 218 are planar walls, however; the walls 212, 214, 216, 218 may be curved in other various embodiments.

In an exemplary embodiment, the cage polarization slot 202 is formed in the first end wall 130 and the front wall 212. For example, the cage polarization slot 202 may be stamped into the first end wall 130 and the front wall 212. The cage polarization slot 202 has a slot width 206. The slot width 206 may be equal to or slightly wider than the protrusion width 199 of the protrusion 192 of the module polarization feature 190 to receive the protrusion 192. The cage polarization slot 202 is located a first distance 208 from the first side wall 134 and a second distance 209 from the second side wall 134. The second distance 209 may be greater than the first distance 208. The cage polarization slot 202 is open at the front (for example, open through the front wall 212 and open at the front edge 131). The outer wall 214 covers the cage polarization slot 202, such as to prevent interference or blocking of the module polarization feature 190 as the module polarization feature 190 is plugged into the receptacle cage 110.

The gasket 142 is coupled to the first end wall 130. Other gaskets may be coupled to the second end wall 132 and the side walls 134, 136. However, in the illustrated embodiment, the gasket 142 coupled to the first end wall 130 includes a polarization feature(s) associated with the cage polarization feature 200. However, the other gaskets 142 may include similar features.

The gasket 142 includes a base 150, the inner spring fingers 148, and outer spring fingers 152. The base 150 is coupled to the first end wall 130 and/or the hood 210. The inner spring fingers 148 extend from the base 150 of the gasket 142 to an interior of the receptacle cage 110, such as into the module channel 116. The outer spring fingers 152 extend from the base 150 to an exterior of the receptacle cage 110, such as along the exterior of the hood 210. The gasket 142 extends along the front edge 131 of the first end wall 130. The gasket 142 extends along the hood 210, such as along the front wall 212 and the outer wall 214. The gasket 142 extends along the cage polarization feature 200. The base 150 may be clipped to the receptacle cage 110, such as to the front wall 212 and/or the first end wall 130 and/or the outer wall 214. Alternatively, the base 150 may be soldered or welded to the receptacle cage 110.

In an exemplary embodiment, the spring fingers 148, 152 are deflectable. The middle portions of the spring fingers 148, 152 may be curved while the ends of the spring fingers 148, 152 engage and are supported by the receptacle cage 110. The raised middle portions may be compressible, such as when engaging the pluggable module 106 or the panel, respectively. The outer spring fingers 152 are connected to the base 150 and extend to distal ends 154. Outer gaps 156 are located between the outer spring fingers 152. The outer spring fingers 152 are independently movable relative to each other.

The inner spring fingers 148 are connected to the base 150. Each inner spring finger 148 includes a front beam 160 and an inner beam 162 extending from the front beam 160. The front beam 160 extends from the base 150. The front beam 160 extends along the front wall 212. The inner beam 162 extends along the first end wall 130, such as along the interior surface of the first end wall 130. The inner beam 162 extends to a distal end 164. Inner gaps 166 are located between the inner spring fingers 148. The inner spring fingers 148 are independently movable relative to each other. The inner gaps 166 are aligned with the cage polarization slot(s) 202. The inner gaps 166 have gap widths 168. The gap widths 168 may be approximately equal to the slot width 206. The gap widths 168 may be equal to or slightly wider than the protrusion width 199 of the protrusion 192 of the module polarization feature 190 to receive the protrusion 192. In the illustrated embodiment, eight inner spring fingers 148 are provided with seven inner gaps 166 between the inner spring fingers 148. Greater or fewer inner spring fingers 148 and inner gaps 166 may be provided in alternative embodiments depending on the overall width of the module channel 116 and the desired gap widths 168 and inner spring finger widths. Any number of the cage polarization slot(s) 202 may be provided in the receptacle cage 110 aligned with the corresponding inner gaps 166. The positions and number of cage polarization slot(s) 202 define a polarization or key for keyed mating with the corresponding pluggable module 106.

During assembly, the pluggable module 106 (shown in FIGS. 1 and 2) is received in the module channel 116 and is electrically connected to the communication connector 112 when plugged therein. During mating, the module polarization feature(s) 190 is aligned with the cage polarization feature(s) 200. The protrusion 192 is received in the cage polarization slot 202. Optionally, there may be clearance between the protrusion 192 and the outer wall 214 of the hood 210 such that the hood 210 does not interfere with loading of the pluggable module 106 into the receptacle cage 110. However, if the pluggable module 106 were improperly oriented relative to the receptacle cage 110, such as if the module polarization feature 190 were misaligned with the cage polarization feature 200, the polarization features 190, 200 would restrict mating. For example, the front wall 212 would block loading of the protrusion 192 into the chamber 204.

Figure 5:
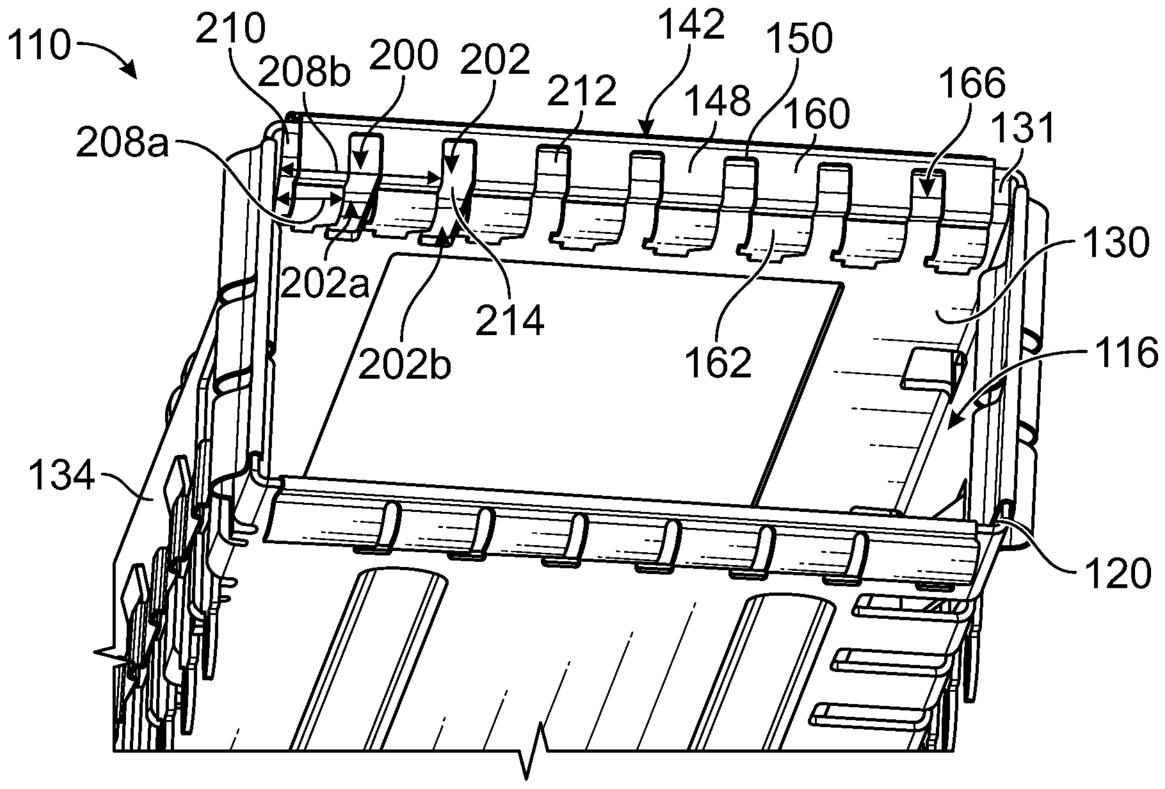
FIG. 5 is a front perspective view of the front end of the receptacle cage in accordance with an exemplary embodiment showing a second polarization orientation.

FIG. 5 is a front perspective view of the front end 120 of the receptacle cage 110 in accordance with an exemplary embodiment showing a second polarization orientation. The receptacle cage 110 includes a plurality of the cage polarization features 200 configured to interface with corresponding module polarization features 190 of the pluggable module 106. In the illustrated embodiment, two of the cage polarization features 200 are provided along the first end wall 130. The cage polarization features 200 are cage polarization slots 202 aligned with the corresponding inner gaps 166 of the gasket 142. In the illustrated embodiment, the cage polarization slots 202 are adjacent to each other being aligned with adjacent inner gaps 166. Other locations are possible in alternative embodiments to define a different polarization orientation.

The hood 210 surrounds the cage polarization features 200. Both cage polarization slots 202 are open to the chamber 204 of the hood 210 to receive the module polarization features 190. The cage polarization slots 202 are formed in the first end wall 130 and the front wall 212. The first cage polarization slot 202*a* is located a first distance 208*a* from the first side wall 134. The second cage polarization slot 202*b* is located a second distance 208*b* from the first side wall 134. The cage polarization slots 202 are open at the front (for example, open through the front wall 212 and open at the front edge 131). The outer wall 214 covers the cage polarization slots 202.

The gasket 142 is coupled to the first end wall 130. The inner spring fingers 148 extend from the base 150 into the module channel 116. The front beams 160 extend along the front wall 212. The inner beams 162 extends along the first end wall 130. The inner gaps 166 are aligned with the cage polarization slots 202.

Figure 6:
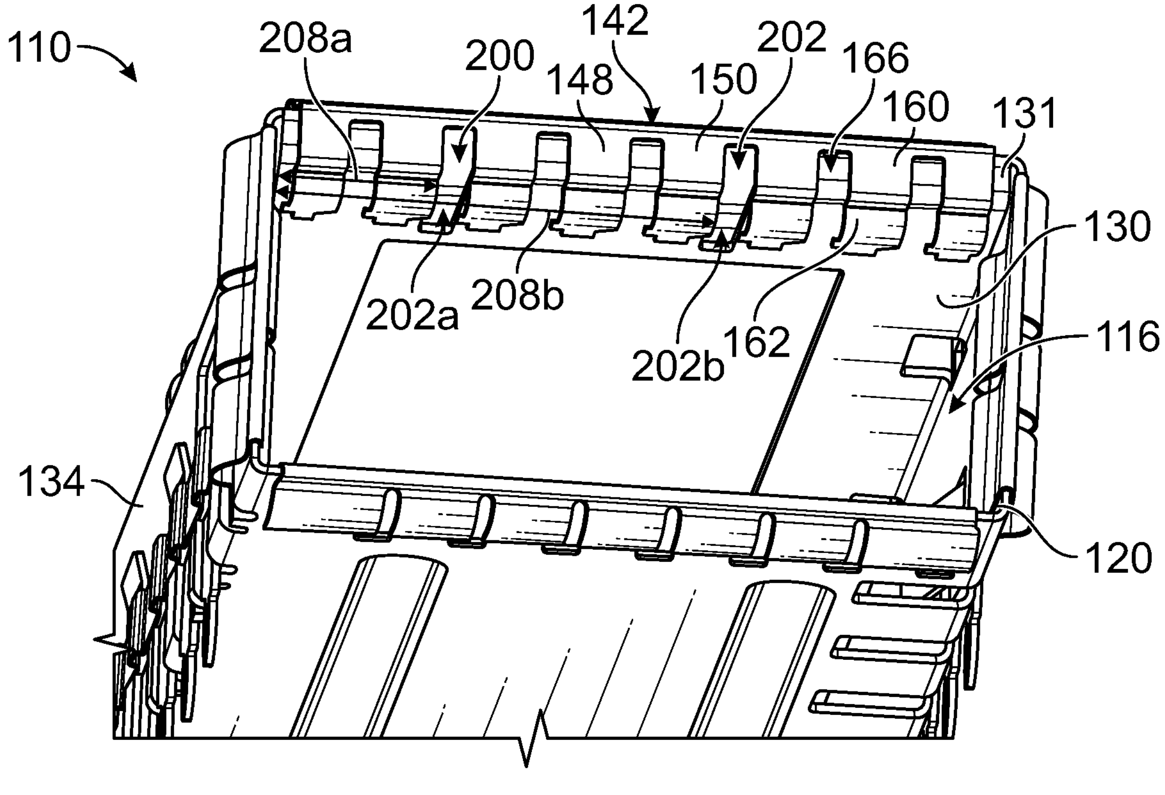
FIG. 6 is a front perspective view of the front end of the receptacle cage in accordance with an exemplary embodiment showing a third polarization orientation.

FIG. 6 is a front perspective view of the front end 120 of the receptacle cage 110 in accordance with an exemplary embodiment showing a third polarization orientation. The receptacle cage 110 includes a plurality of the cage polarization features 200 configured to interface with corresponding module polarization features 190 of the pluggable module 106. In the illustrated embodiment, two of the cage polarization features 200 are provided along the first end wall 130. The cage polarization features 200 are cage polarization slots 202 aligned with the corresponding inner gaps 166 of the gasket 142. In the illustrated embodiment, the cage polarization slots 202 are spaced apart from each other, such as with at least one inner gap 166 closed between the cage polarization slots 202. The cage polarization slots 202 may be spaced apart from the sides, such as having one or more inner gaps 166 outside of the cage polarization slots 202. Other locations are possible in alternative embodiments to define a different polarization orientation.

Figure 7:
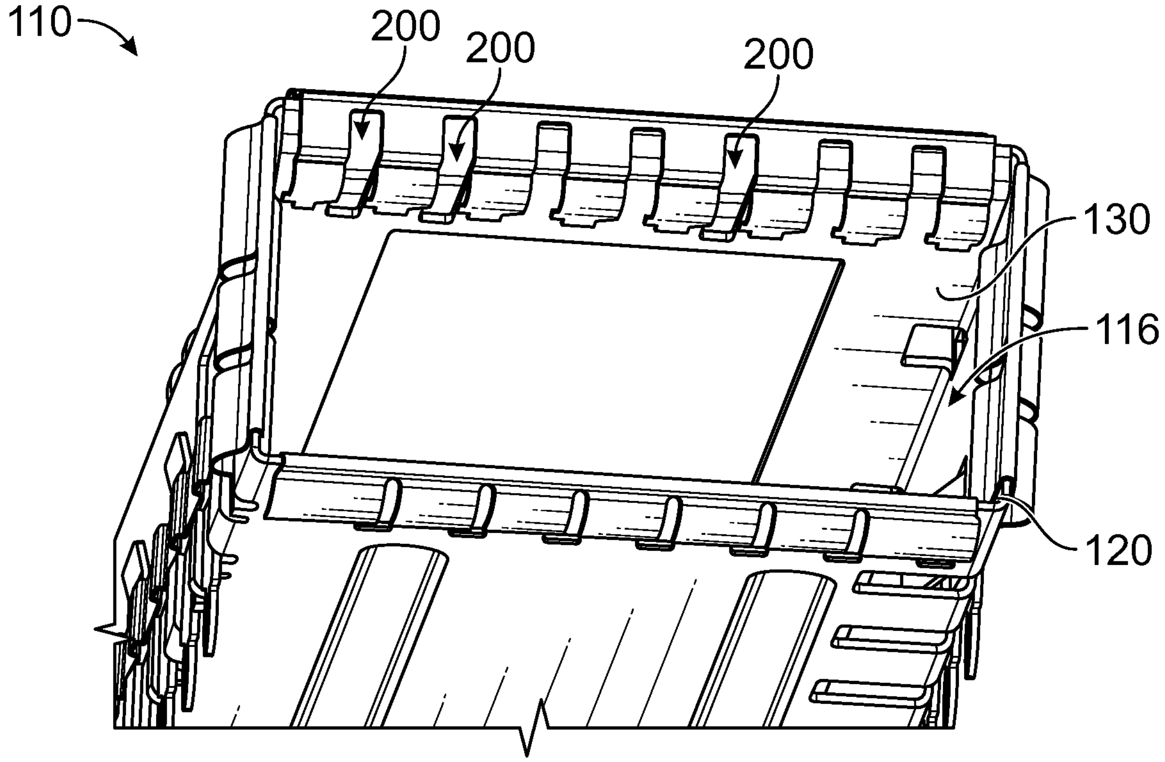
FIG. 7 is a front perspective view of the front end of the receptacle cage in accordance with an exemplary embodiment showing a fourth polarization orientation.

FIG. 7 is a front perspective view of the front end 120 of the receptacle cage 110 in accordance with an exemplary embodiment showing a fourth polarization orientation. The receptacle cage 110 includes a plurality of the cage polarization features 200 configured to interface with corresponding module polarization features 190 of the pluggable module 106. In the illustrated embodiment, three of the cage polarization features 200 are provided along the first end wall 130. Greater or fewer cage polarization features 200 may be provided and the cage polarization features 200 may be in other positions in alternative embodiments.

Figure 8:
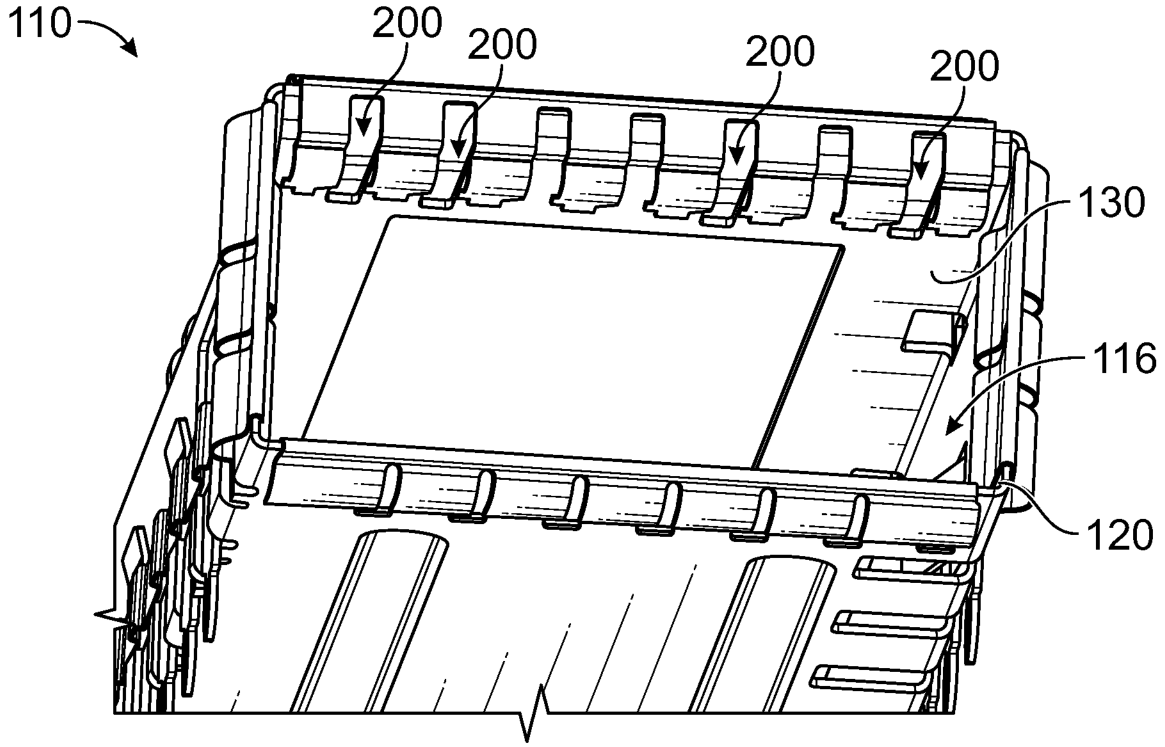
FIG. 8 is a front perspective view of the front end of the receptacle cage in accordance with an exemplary embodiment showing a fifth polarization orientation.

FIG. 8 is a front perspective view of the front end 120 of the receptacle cage 110 in accordance with an exemplary embodiment showing a fifth polarization orientation. The receptacle cage 110 includes a plurality of the cage polarization features 200 configured to interface with corresponding module polarization features 190 of the pluggable module 106. In the illustrated embodiment, four of the cage polarization features 200 are provided along the first end wall 130. Greater or fewer cage polarization features 200 may be provided and the cage polarization features 200 may be in other positions in alternative embodiments.

Figure 9:
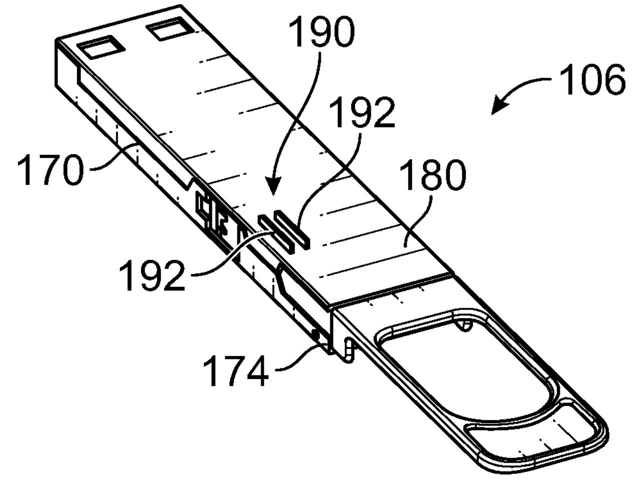
FIG. 9 is a front perspective view of the front end of the pluggable module in accordance with an exemplary embodiment showing a second polarization orientation for the pluggable module.

FIG. 9 is a front perspective view of the front end 174 of the pluggable module 106 in accordance with an exemplary embodiment showing a second polarization orientation for the pluggable module 106. The pluggable module 106 includes a plurality of the module polarization features 190. In the illustrated embodiment, two of the module polarization features 190 (for example, protrusions 192) are provided along the top 180 of the pluggable body 170. Greater or fewer module polarization features 190 may be provided and the module polarization features 190 may be in other positions in alternative embodiments.

Figure 10:
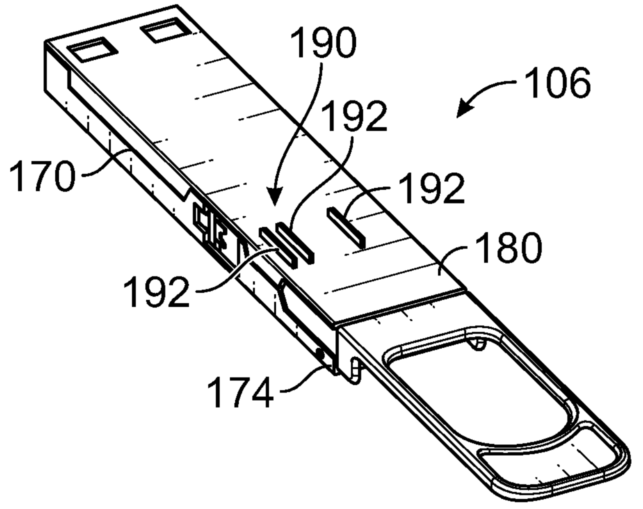
FIG. 10 is a front perspective view of the front end of the pluggable module in accordance with an exemplary embodiment showing a fourth polarization orientation for the pluggable module.

FIG. 10 is a front perspective view of the front end 174 of the pluggable module 106 in accordance with an exemplary embodiment showing a fourth polarization orientation for the pluggable module 106. The pluggable module 106 includes a plurality of the module polarization features 190. In the illustrated embodiment, three of the module polarization features 190 (for example, protrusions 192) are provided along the top 180 of the pluggable body 170. Greater or fewer module polarization features 190 may be provided and the module polarization features 190 may be in other positions in alternative embodiments.

Figure 11:
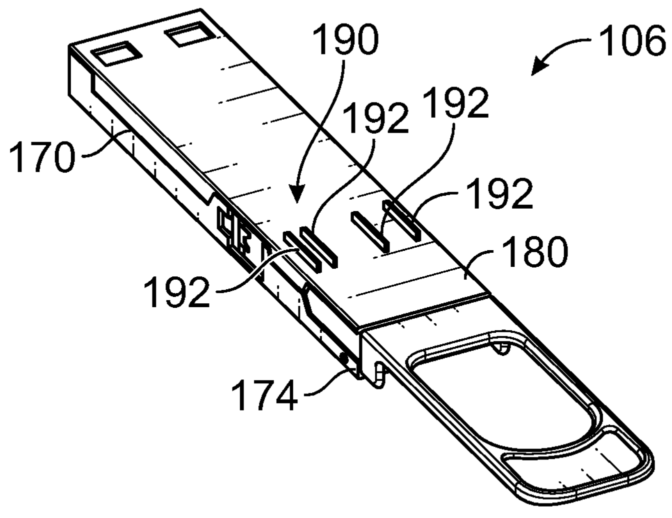
FIG. 11 is a front perspective view of the front end of the pluggable module in accordance with an exemplary embodiment showing a fifth polarization orientation for the pluggable module.

FIG. 11 is a front perspective view of the front end 174 of the pluggable module 106 in accordance with an exemplary embodiment showing a fifth polarization orientation for the pluggable module 106. The pluggable module 106 includes a plurality of the module polarization features 190. In the illustrated embodiment, four of the module polarization features 190 (for example, protrusions 192) are provided along the top 180 of the pluggable body 170. Greater or fewer module polarization features 190 may be provided and the module polarization features 190 may be in other positions in alternative embodiments.

Figure 12:
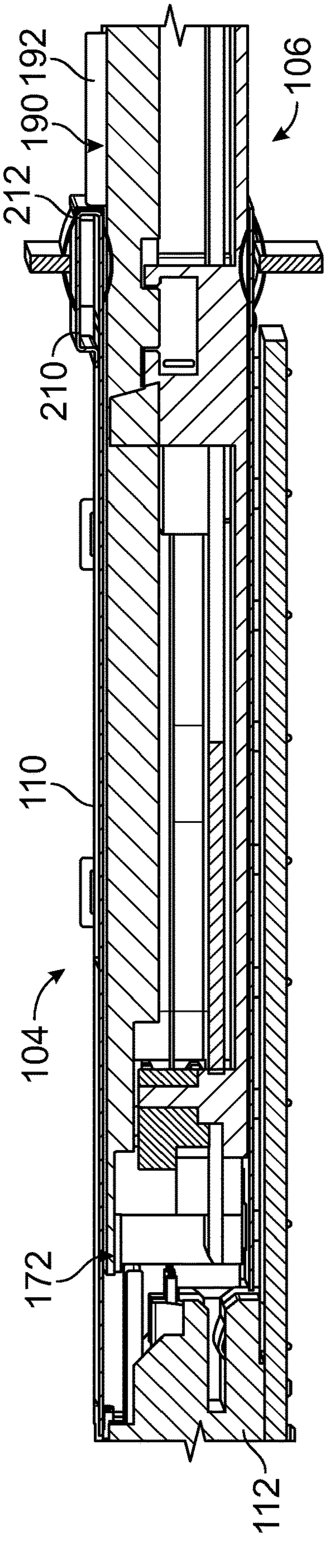
FIG. 12 is a cross-sectional view of the communication system in accordance with an exemplary embodiment.

FIG. 12 is a cross-sectional view of the communication system 100 showing an incorrect (non-polarized) pluggable module 106 mated with the receptacle connector assembly 104. The pluggable module 106 does not include the correct key for mating with the receptacle cage 110. For example, the module polarization features 190 is not aligned with the cage polarization feature 200. The protrusion 192 stops against the hood 210. The rear edge of the protrusion 192 stops against the front wall 212 to prevent fully loading the pluggable module 106 into the receptacle cage 110. When the protrusion 192 stops against the hood 210, the mating end 172 of the pluggable module 106 stops short of the communication connector 112. The polarization features 190, 200 restrict mating of the non-polarized pluggable module 106 with the receptacle connector assembly 104, such as to prevent mechanical and electrical connection. The polarized mating allows mating of only certain polarized pluggable modules 106 with the receptacle connector assembly 104 and restricts mating of the non-polarized (incorrect) pluggable modules 106, such as to prevent damage to the components or improper operation of the communication system 100.

Figure 13:
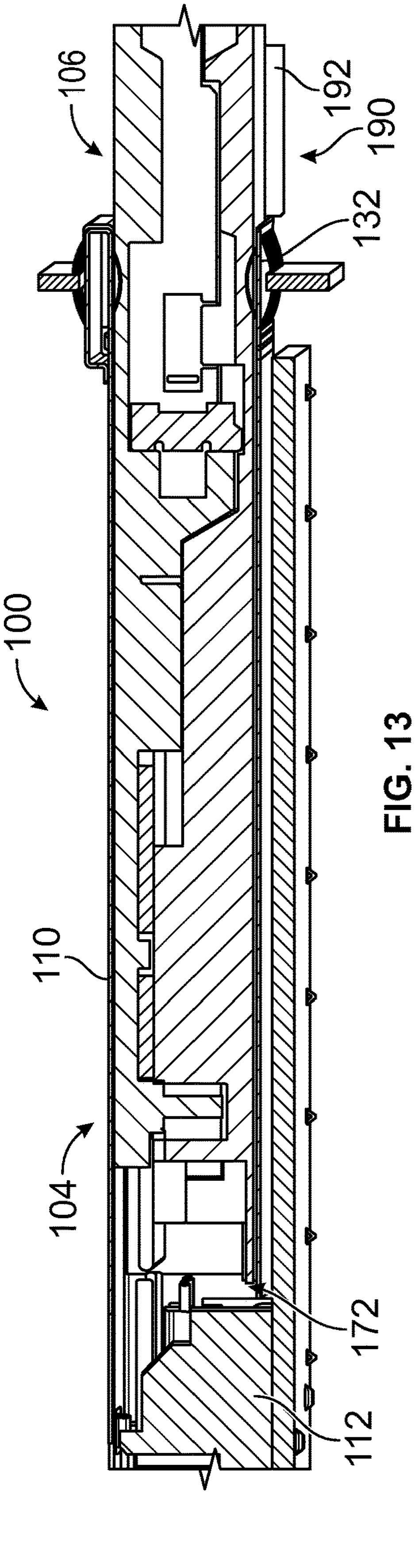
FIG. 13 is a cross-sectional view of the communication system in accordance with an exemplary embodiment.

FIG. 13 is a cross-sectional view of the communication system 100 showing the pluggable module 106 improperly mated with the receptacle connector assembly 104. The pluggable module 106 is shown mated up-side down in the receptacle cage 110. The module polarization features 190 stops against the front edge of the second end wall 132 to limit or stop loading of the pluggable module 106 into the receptacle cage 110. The second end wall 132 does not include any cage polarization features 200 (for example, the second end wall 132 does not include any cage polarization slots 202) and thus the protrusion 192 is unable to be loaded into the receptacle cage 110. When the protrusion 192 stops against the second end wall 132, the mating end 172 of the pluggable module 106 stops short of the communication connector 112, such as to prevent damage to the components or improper operation of the communication system 100.

Figure 14:
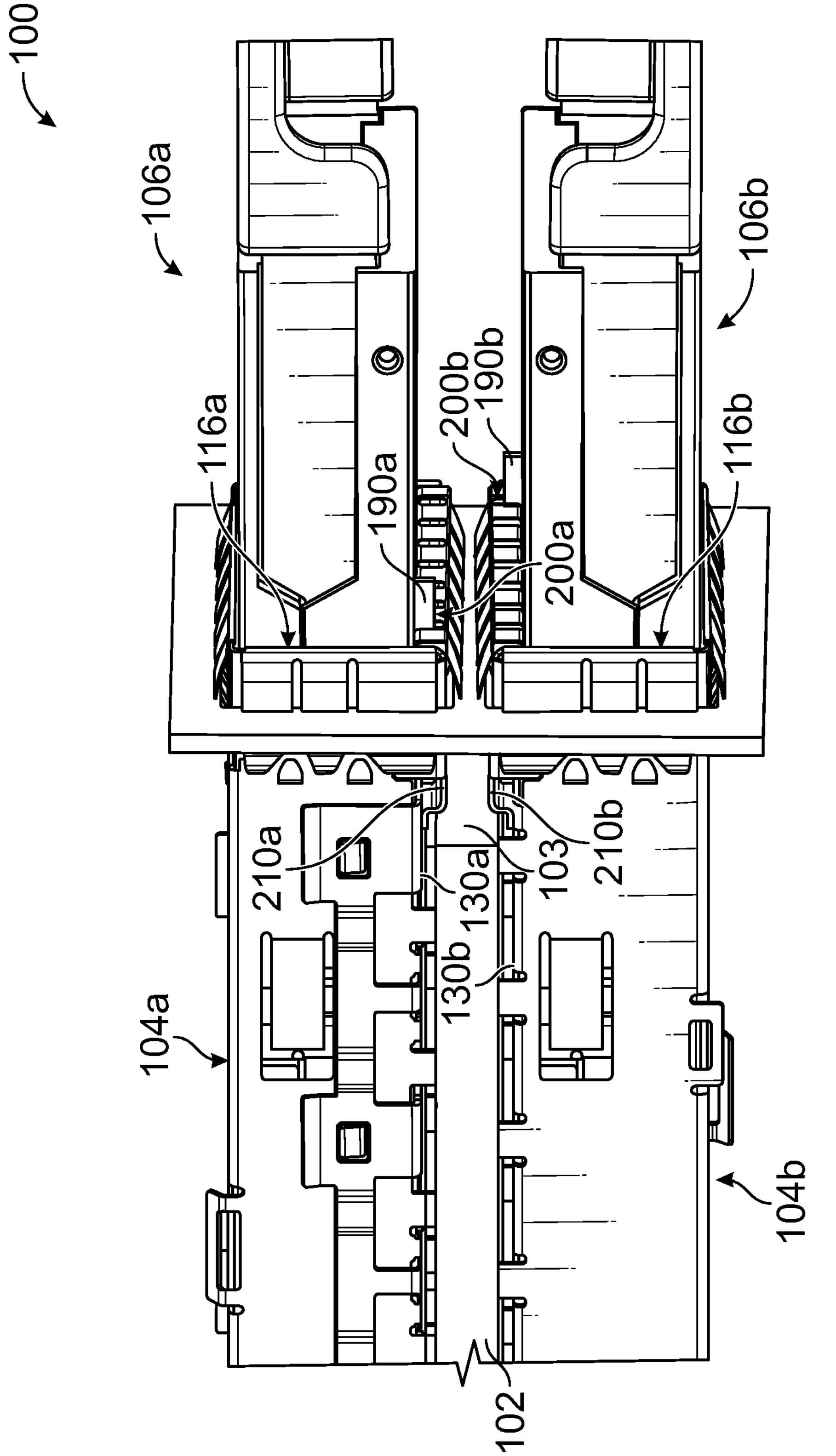
FIG. 14 is a cross-sectional view of the communication system in accordance with an exemplary embodiment.

FIG. 14 is a cross-sectional view of the communication system 100 in accordance with an exemplary embodiment. FIG. 14 shows an upper receptacle connector assembly 104*a* mounted to the upper surface of the host circuit board 102 and a lower receptacle connector assembly 104*b* mounted to the lower surface of the host circuit board 102. In an exemplary embodiment, the upper and lower receptacle connector assemblies 104*a*, 104*b* both include cage polarization features 200 for keyed mating of the upper and lower pluggable modules 106*a*, 106*b* with the upper and lower receptacle connector assemblies 104*a*, 104*b*.

In an exemplary embodiment, the first end walls 130 define interior walls that face and are mounted to the host circuit board 102. For example, the first end wall 130*a* of the upper receptacle connector assembly 104*a* is a bottom wall coupled to the upper surface of the host circuit board 102, whereas the first end wall 130*b* of the lower receptacle connector assembly 104*b* is a top wall coupled to the lower surface of the host circuit board 102. In an exemplary embodiment, the hood 210*a* of the upper receptacle connector assembly 104*a* is at the bottom, whereas the hood 210*b* of the lower receptacle connector assembly 104*b* is at the top. The hood 210*a* is located forward of an edge 103 of the host circuit board 102. The cage polarization feature 200*a* is located at the bottom. The upper receptacle connector assembly 104*a* requires the upper pluggable module 106*a* to be loaded into the module channel 116*a* in an upside down orientation (for example, with the module polarization feature 190*a* at the bottom). The hood 210*b* is located forward of the edge 103 of the host circuit board 102. The cage polarization feature 200*b* is located at the top. The lower receptacle connector assembly 104*b* requires the lower pluggable module 106*b* to be loaded into the module channel 116*b* in a right-side up orientation (for example, with the module polarization feature 190*b* at the top). In an exemplary embodiment, orienting the hoods 210*a*, 210*b* forward of the edge 103 of the host circuit board 102, as opposed to the opposite orientations, allows for greater airflow along the top and bottom of the upper and lower receptacle connector assemblies 104*a*, 104*b*, respectively. For example, thermal transfer elements, such as heat sinks, may be coupled to the top and bottom of the upper and lower receptacle connector assemblies 104*a*, 104*b*, respectively for efficient heat dissipation without interference from the hoods 210*a*, 210*b*.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A receptacle cage comprising:

shielding walls forming a module channel configured to receive a pluggable module, the shielding walls including a first end wall, a first side wall extending from the first end wall and a second side wall extending from the first end wall opposite the first side wall, wherein the first end wall, the first side wall and the second side wall form the module channel;

a hood extending from the first end wall forming a chamber located radially outside of the module channel with the first end wall separating the module channel from the chamber such that the first end wall is located between the module channel and the chamber; and a cage polarization slot formed in the first end wall at a first distance from the first side wall, the cage polarization slot open to the chamber, the cage polarization slot configured to receive a module polarization feature of the pluggable module such that the module polarization feature is located in the chamber and covered by the hood.

2. The receptacle cage of claim 1, wherein the cage polarization slot is a first cage polarization slot, the receptacle cage further comprising a second cage polarization slot formed in the first end wall at a second distance from the first side wall, the second cage polarization slot being open to the chamber, the second cage polarization slot configured to receive a second module polarization feature of the pluggable module.

3. The receptacle cage of claim 1, wherein the first end wall includes polarization positions arranged at intervals across a front of the first end wall, the cage polarization slot being selectively positionable at a first polarization position of the polarization positions to define a first mating polarization or at a second polarization position of the polarization positions to define a second polarization.

4. The receptacle cage of claim 3, wherein the cage polarization slot is a first cage polarization slot, the receptacle cage further comprising a second cage polarization slot formed in the first end wall, the second cage polarization slot being positionable at a different one of the polarization positions than the first cage polarization slot.

5. The receptacle cage of claim 1, further comprising an EMI gasket coupled to the hood in the first end wall, the EMI gasket having a plurality of deflectable spring fingers, the deflectable spring fingers including inner spring fingers extending along the first end wall inside the module channel to interface with the pluggable module, the inner spring fingers being separated by inner gaps, the cage polarization slot being aligned with the corresponding inner gap of the EMI gasket between the inner spring fingers.

6. The receptacle cage of claim 1, wherein the hood is provided at a front end of the shielding walls.

7. The receptacle cage of claim 1, wherein the hood is integral with the first end wall.

8. The receptacle cage of claim 1, wherein the hood includes a front wall extending from a front of the first end wall and an outer wall extending rearward from the front wall, the chamber being defined rearward of the front wall between the first end wall and the outer wall, wherein the cage polarization slot is formed in the front wall.

9. The receptacle cage of claim 8, wherein the hood includes a rearward wall extending from the outer wall, the rear wall being coupled to the first end wall, the rear wall located rearward of the chamber.

10. A receptacle cage comprising:

shielding walls forming a module channel configured to receive a pluggable module, the shielding walls including a first end wall, a first side wall extending from the first end wall and a second side wall extending from the first end wall opposite the first side wall, wherein the first end wall, the first side wall and the second side wall form the module channel;

a hood extending from the first end wall forming a chamber located radially outside of the module channel with the first end wall separating the module channel from the chamber such that the first end wall is located between the module channel and the chamber;

an EMI gasket coupled to the hood and the first end wall, the EMI gasket having a plurality of deflectable spring fingers, the deflectable spring fingers including inner spring fingers extending along the first end wall inside the module channel to interface with the pluggable module, the inner spring fingers separated by inner gaps; and a cage polarization feature for keyed mating of the pluggable module in the module channel, the cage polarization feature including at least one cage polarization slot formed in the first end wall being open to the chamber, each cage polarization slot being aligned with the corresponding inner gap of the EMI gasket between the inner spring fingers, each cage polarization slot configured to receive a corresponding module polarization feature of the pluggable module.

11. The receptacle cage of claim 10, wherein the inner gap has a gap with, the cage polarization slot have a slot width, the slot width being equal to the gap width.

12. The receptacle cage of claim 10, wherein the EMI gasket includes a front wall, the front wall including front wall gaps associated with the inner gaps, wherein the cage polarization slot is aligned with the corresponding front wall gap.

13. The receptacle cage of claim 10, wherein the deflectable spring fingers include outer spring fingers extending along the exterior of the hood.

14. A set of receptacle cages comprising:

a plurality of receptacle cages including a first receptacle cage and a second receptacle cage, each receptacle cage of the plurality of receptacle cages comprising:

shielding walls forming a module channel configured to receive a pluggable module, the shielding walls including a first end wall, a first side wall extending from the first end wall and a second side wall extending from the first end wall opposite the first side wall, wherein the first end wall, the first side wall and the second side wall form the module channel;

a hood extending from the first end wall forming a chamber located radially outside of the module channel with the first end wall separating the module channel from the chamber such that the first end wall is located between the module channel and the chamber; and a cage polarization slot formed in the first end wall, the cage polarization slot open to the chamber, the cage polarization slot configured to receive a module polarization feature of the pluggable module such that the module polarization feature is located in the chamber and covered by the hood;

wherein the cage polarization slot of the first receptacle cage is located a first distance from the first side wall of the first receptacle cage and the cage polarization slot of the second receptacle cage is located a second distance from the first side wall of the second receptacle cage, the second distance different than the first distance such that the pluggable module pluggable into the module channel of the first receptacle cage is unable to plug into the module channel of the second receptacle cage.

15. The set of receptacle cages of claim 14, wherein the first receptacle cage is coupled to an upper surface of a circuit board and the second receptacle cage is coupled to a lower surface of the circuit board, wherein the hood of the first receptacle cage is located forward of an edge of the circuit board and faces the second receptacle cage, and wherein the hood of the second receptacle cage is located forward of the edge of the circuit board and faces the first receptacle cage.

16. The set of receptacle cages of claim 14, wherein at least one of the first receptacle cage and the second receptacle cage includes a second cage polarization slot.

17. The set of receptacle cages of claim 14, wherein the plurality of receptacle cages includes a third receptacle cage, the cage polarization slot of the third receptacle cage is located a third distance from the first side wall of the third receptacle cage, the third distance being different than the first distance and different than the second distance.

18. The set of receptacle cages of claim 14, wherein the plurality of receptacle cages includes a third receptacle cage, the cage polarization slot of the third receptacle cage is a first cage polarization slot located the first distance from the first side wall of the third receptacle cage, the third receptacle cage including a second cage polarization slot located a third distance from the first side wall of the third receptacle cage, the third distance being different than the first distance.

19. The set of receptacle cages of claim 14, wherein each receptacle cage of the plurality of receptacle cages further comprises an EMI gasket coupled to the hood in the first end wall, the EMI gasket having a plurality of deflectable spring fingers, the deflectable spring fingers including inner spring fingers extending along the first end wall inside the module channel to interface with the pluggable module, the inner spring fingers being separated by inner gaps, the cage polarization slot being aligned with the corresponding inner gap of the EMI gasket between the inner spring fingers.

20. The set of receptacle cages of claim 14, wherein the hood includes a front wall extending from a front of the first end wall and an outer wall extending rearward from the front wall, the chamber being defined rearward of the front wall between the first end wall and the outer wall, wherein the cage polarization slot is formed in the front wall.

* * * * *